(12) United States Patent
Udd

(10) Patent No.: US 7,306,202 B2
(45) Date of Patent: Dec. 11, 2007

(54) APPARATUS FOR AN INTERNAL COMBUSTION ENGINE

(75) Inventor: Soren Udd, Nodinge (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/905,463

(22) Filed: Jan. 5, 2005

(65) Prior Publication Data

US 2005/0087716 A1 Apr. 28, 2005

Related U.S. Application Data

(63) Continuation of application No. PCT/SE03/01033, filed on Jun. 18, 2003, now abandoned.

(30) Foreign Application Priority Data

Jul. 5, 2002 (SE) .................................... 0202124

(51) Int. Cl.
*F01L 1/34* (2006.01)
(52) U.S. Cl. ..................................... 251/251; 123/90.16
(58) Field of Classification Search ............. 123/90.12, 123/90.16, 90.27; 251/251–253, 257, 260, 251/262, 263
See application file for complete search history.

(56) References Cited

U.S. PATENT DOCUMENTS

| 3,938,483 A | 2/1976 | Firey |
| 6,170,474 B1 | 1/2001 | Israel |
| 6,550,435 B1 * | 4/2003 | Zubeck ..................... 123/90.16 |
| 6,647,935 B2 * | 11/2003 | Aoyama et al. ......... 123/90.16 |

* cited by examiner

*Primary Examiner*—J. Casimer Jacyna
(74) *Attorney, Agent, or Firm*—Novak Druce & Quigg, LLP

(57) ABSTRACT

Apparatus and method for controlling valve movements in an internal combustion engine that has at least one inlet valve (12) and at least one exhaust valve for controlling the connection between the combustion chamber in the cylinder and an inlet system and an exhaust system respectively. A rotatable camshaft is provided that has a cam curve including a rising ramp (10*a*) and a falling ramp (10*b*) that is designed to interact with a valve mechanism (14) for actuation of the inlet or exhaust valve (12) under the action of a valve spring (13). The valve mechanism (14) includes control members (21, 22, 23, 24, 25 and 26) that allow return movement of the valve mechanism to be controlled during the closing phase of the inlet valve (12) or the exhaust valve, independently of the falling ramp (10*b*) of the cam curve. The control members (21, 22, 23, 24, 25 and 26) are arranged so that the closing of the valve can be delayed for an adjustable period of time by means of a hydraulically adjustable force counteracting the closing force of the valve spring.

9 Claims, 2 Drawing Sheets

APPARATUS FOR AN INTERNAL COMBUSTION ENGINE

CROSS-REFERENCE TO RELATED APPLICATIONS

The present application is a continuation patent application of International Application No. PCT/SE03/01033 filed 18 Jun. 2003 now abandoned which was published in English pursuant to Article 21(2) of the Patent Cooperation Treaty, and which claims priority to Swedish Application No. 0202124-4 filed 5 Jul. 2002. Said applications are expressly incorporated herein by reference in their entireties.

TECHNICAL FIELD

The present invention relates to an apparatus for controlling valve movements in an internal combustion engine which has at least one inlet valve and at least one exhaust valve for controlling the connection between the combustion chamber in the cylinder and an intake system and an exhaust system, respectively. A rotating camshaft is provided that has a cam curve including a rising ramp and a falling ramp that is configured (designed) to interact with a valve mechanism for actuation of the inlet or exhaust valve under the action of a valve spring. The valve mechanism includes control members that allow the return movement of the valve mechanism to be controlled during the closing phase of the inlet valve or the exhaust valve, independently of the falling ramp of the cam curve.

BACKGROUND OF THE INVENTION

In internal combustion engines for vehicles, it is sometimes desirable to have the facility for switching between different operating modes. For example, it is possible to switch between a conventional symmetrical cycle and an asymmetrical cycle, such as a so-called Miller cycle, by varying the timing of the inlet valve closure during the engine's induction stroke. The advantage in being able to switch between these different operating modes lies, for example, in the ability to vary the effective compression ratio of the engine in order to optimize efficiency and reduce exhaust emissions to a minimum. For this purpose, therefore, variable valve actuation is necessary.

The experimental use of electronically controlled hydraulic actuators for variable valve actuation as an alternative to mechanical valve systems is already known. These known systems are at present still very expensive and still not sufficiently reliable and robust and require a very sophisticated system of timing in order, among other things, to avoid collision between valves and piston and to cope with a viscosity that varies with temperature.

Other mechanical systems are disclosed, for example by U.S. Pat. No. 4,829,949, which permit mechanical changeover from one operating mode to another. These known systems are mechanically complex and call for extremely high precision both in manufacturing and servicing.

One known method is to achieve variable valve movements by means of mechanical-hydraulic systems of the "lost motion" type. These are characterized by a hydraulic link which forms part of the mechanical valve mechanism and which can be alternately opened or closed by means of a solenoid valve, for example. When closed, the movement of the valve is controlled by the cam curve in the same way as in a conventional mechanical system. When valve closure is to be advanced, for example, the hydraulic link is opened by means of the solenoid valve, so that the valve ceases to follow the cam curve and can thereby be made to close.

The disadvantage with the system described above is that the energy stored in the valve spring (which in a conventional mechanical system is largely recovered as the valve falls due to the fact that the valve spring force imparts a driving torque to the camshaft) is for the most part lost in a system of the "lost motion" type when the engine is operating in Miller cycle mode.

For engine designs in which the Miller cycle represents the most commonly occurring mode of operation, this energy loss may have a significant impact on the fuel consumption of the engine during a collective drive test cycle.

SUMMARY OF THE INVENTION

The present invention relates to a mechanical/hydraulic valve system in which the aforementioned disadvantages of systems of the "lost motion" type have been eliminated by functioning as a conventional mechanical system in Miller cycle mode. In operating conditions where for various reasons it is desirable to reduce or eliminate the Miller stage, for example in transient conditions or in certain load/engine speed ranges, the mechanical contact between cam curve and valve is broken in that closure of the valve is delayed for an adjustable period of time by means of a hydraulic apparatus counteracting the valve spring closing force.

It may be advantageous in certain operating conditions to set the closing point of the inlet valve to a position situated between early closure and normal closure. The energy loss occurring when the mechanical contact is broken can be reduced by allowing the valve to follow the cam curve during the first part of the valve closing movement, the energy stored in the valve spring being recovered in the form of a drive torque on the camshaft for the part of the closing movement that occurs before the mechanical contact is broken. This method can also be used for the normal closing point and also to particular advantage at lower engine load when the air quantity which must pass through the inlet valve is small and the flow losses are also small despite the reduced valve area in the final phase of the valve closing movement. In this context it is worth pointing out that the engine pistons are always near their bottom dead center in the final phase of inlet valve closure at the normal closing time. This means that the rate of flow through the valve is always relatively low, even at high engine load, which keeps the flow losses to a moderate level. The present invention permits optimization of the inlet valve closure sequence by minimizing the sum of the mechanical losses in the valve system and the flow losses.

In its simplest embodiment, the hydraulic apparatus comprises (includes, but is not necessarily limited to) a hydraulic medium, a cylinder and a piston running in the cylinder, the cylinder being alternately connected to a pump or an outlet, or alternatively sealed, by means of a solenoid valve.

To this end, an apparatus configured according to the teachings of the present invention is characterized by the fact that the control members are arranged so that closure of the valve can be delayed for an adjustable period of time by means of a hydraulically adjustable force counteracting the valve spring closing force.

BRIEF DESCRIPTION OF THE DRAWINGS

The invention will be described in more detail below with reference to an exemplary embodiment which is shown in the attached drawings, in which.

DESCRIPTION OF THE PREFERRED EMBODIMENTS

Figure 1:
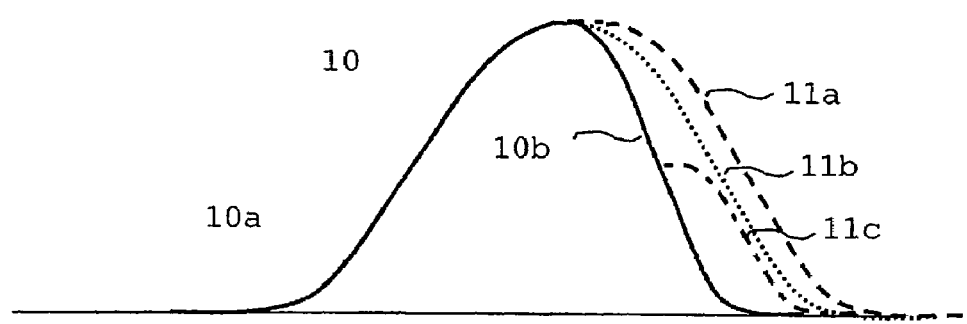
FIG. 1 is a graph curve showing the movement of the inlet valve in the case of a valve mechanism according to the invention.

The graph curve shown in FIG. 1 illustrates how an inlet valve works in an internal combustion engine according to the teachings of the present invention. The engine is designed so that it can switch between a first operating mode corresponding to the solid lines 10 in FIG. 1, and other operating modes corresponding to the lines 11a-11c in FIG. 1. Here, the inlet valve, according to the line 10, follows the rising ramp and falling ramp on a camshaft cam which is designed to operate the internal combustion engine on a Miller cycle with maximum advancement of the inlet valve closure.

This mode of operation means that the inlet valve closes early enough in the inlet phase to allow the gas volume enclosed in the cylinder to expand before the piston reaches its bottom dead center following the inlet phase. The temperature of the gas volume is thereby reduced, so that subsequent compression and ignition can occur at reduced temperature level, which allows the NOx content of the engine exhaust gases to be reduced, while at the same time permitting an increase in engine efficiency.

In a second operating mode, the inlet valve, according to line 11a, follows the rising ramp of the cam curve, but then leaves the falling ramp so that the inlet valve closes at a later point in time (crank angle). Line 11a represents a conventional symmetrical cycle. This common symmetrical cycle may be advantageous when the engine is operating under transient conditions and in certain parts of the engine working range.

In a third operating mode, the inlet valve, according to line 11b, follows the rising ramp of the cam curve, but leaves the falling ramp so that the inlet valve closes at a point in time situated between early and normal closure.

In a fourth operating mode, the inlet valve, according to line 11c, follows the rising ramp and the first part of the falling ramp of the cam curve, but then leaves the falling ramp so that the inlet valve closes at a point in time situated between early and normal closure.

Figure 2:
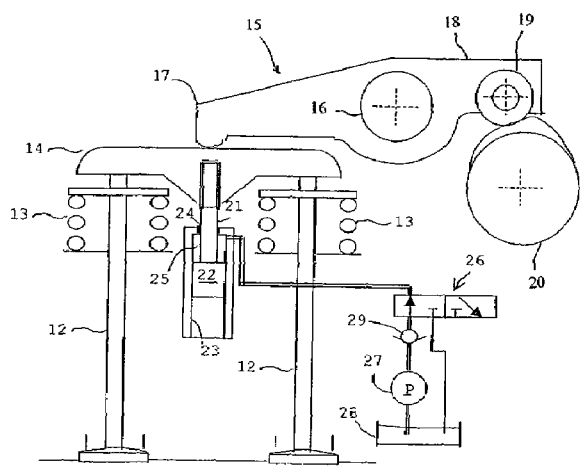
FIG. 2 shows a diagram of a valve mechanism according to a first exemplary embodiment of the invention.

The valve mechanism shown in schematic form in FIG. 2 is located in a cylinder head and comprises double inlet valves 12 with valve springs 13 and a common yoke 14. The yoke is acted upon in a known manner by a rocker 15 which is pivotally supported on a rocker shaft 16. The rocker 15 has a valve pressure arm 17 on one side of the shaft and a cam follower 18 on the other side, the follower being provided with a rocker arm roller 19 which interacts with an overhead camshaft 20. Alternatively a camshaft located at a lower level in the engine can interact with the rocker by way of a valve tappet and a push rod.

The yoke 14 is mounted on a piston rod 21 which is supported so that it is vertically displaceable by a piston 22 in a cylinder 23. The end 24 of the cylinder is provided with sealing against the piston rod 21 so that a fluid-tight space 25 is formed between the piston and the end. The space 25 is connected via a pipe and a control valve 26 to a pressure pump 27. FIG. 2 shows the control valve 26 in an active position in which the pump 27 can deliver hydraulic fluid from a reservoir 28 to the space 25 via a non-return valve 29. In the other position of the control valve, the hydraulic fluid can be dumped from the space 25 into the reservoir 28.

The valve mechanism, therefore normally follows the lifting curve 10, the control valve 26 being situated in its inactive control position. In this position unpressurized hydraulic fluid can flow freely between the space 25 and the reservoir 28 while the yoke 14 moves down and up under the action of the rocker in one direction and the valve springs 13 in the other direction.

When the engine control unit registers that it is time to switch to another operating mode, the control valve is made to assume its active position (as shown in FIG. 2). The next depression of the yoke 14, under the action of the valve mechanism, enables the pump 27 to fill the space 25 with hydraulic fluid from the reservoir 28. Once the downward movement is completed and the yoke commences its upward movement, the yoke is prevented for a suitable period of time from moving upwards (FIG. 2) under the action of the non-return valve 29. The upward movement of the yoke is initiated at a suitable point in time by the control valve being returned again to its inactive position. The inlet valves can thereby be closed at a suitable crank angle.

Information from the angular position of the camshaft or the crankshaft may be used in order to give the precise timing for switching the control valve 26 from the active to the inactive position in order to bring about the desired valve closure. This process is repeated until the engine control unit registers that it is time to switch to another operating mode.

The piston cylinder 21-25, or any other part of the valve mechanism may suitably be provided with damping elements which brake the movement of the valves before they land on their valve seats.

Figure 3:
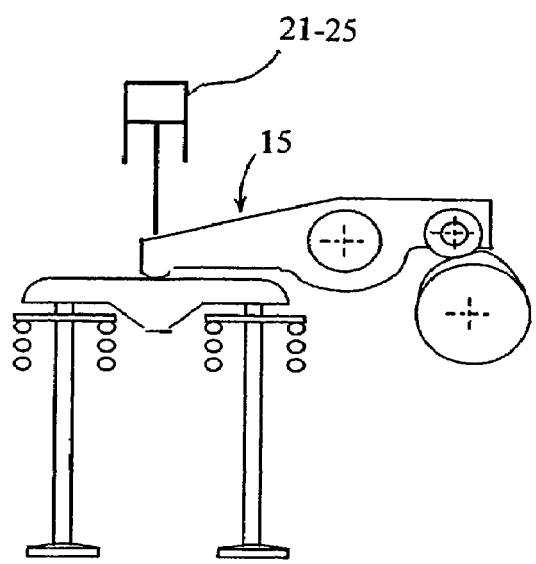
FIGS. 3-5 show smaller scale diagrams of three different variants of the valve mechanism configured according to the teachings of the invention.
Figure 4:
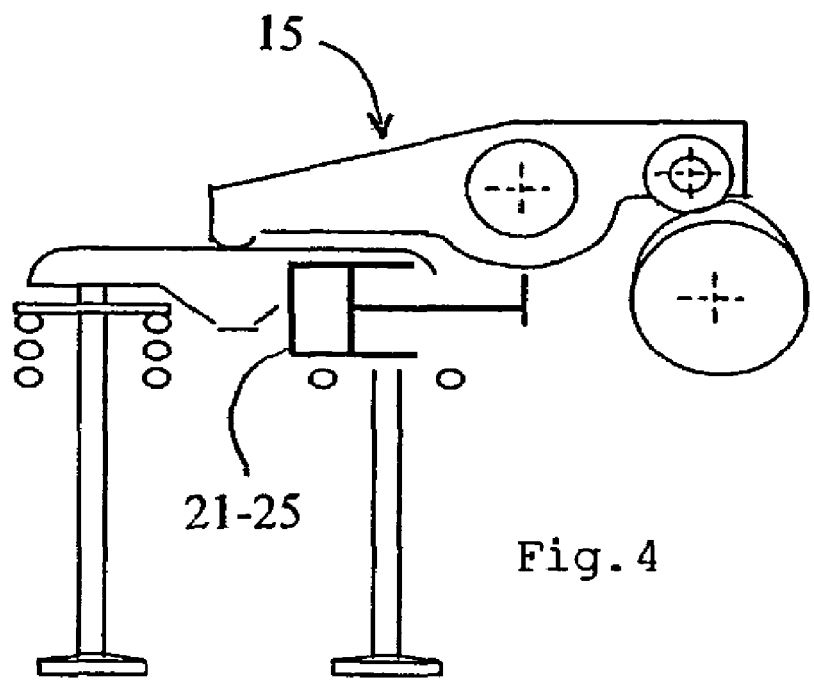

FIGS. 3 and 4 show variants of the invention in which the piston cylinder 21-25 is located so that it acts on the rocker.

Figure 5:
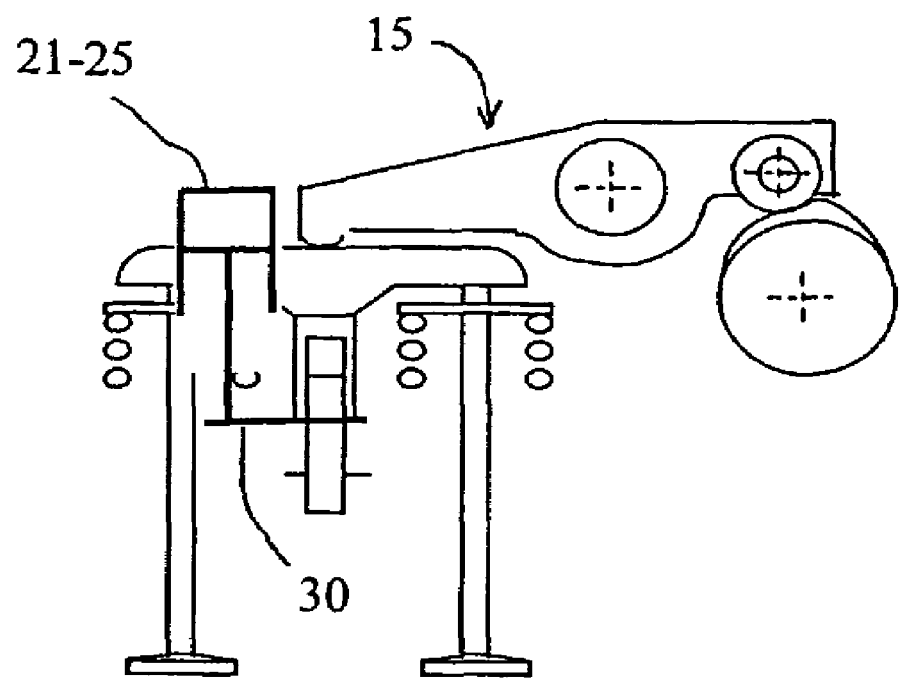

FIG. 5 shows a further variant of the invention in which the piston cylinder is connected to the valve yoke 14 by way of an angle arm 30.

The exemplary apparatus disclosed herein and configured according to the teachings of the present invention has been demonstrated in its application to an inlet valve. It is also possible to apply the apparatus to an exhaust valve. This can be used, for example, for internal return of the exhaust gas, so-called internal exhaust gas recirculation (EGR), a variation of the exhaust valve closing sequence being capable of influencing the quantity of internal EGR by adjusting the overlap between the inlet and exhaust valves on completion of the exhaust stroke.

The invention must not be regarded as being limited to the examplary embodiments described above, a number of further variants and modifications being feasible within the scope of the patented claims. For example, the piston cylinder 21-25 may be differently designed, as may the control valve 26. The piston cylinder 21-25 may, for example, act directly on a valve. In the case of a camshaft located low down, the piston cylinder 21-25 may interact with the push rod or the valve tappet.

What is claimed is:

1. An apparatus for controlling valve movements in an internal combustion engine which has at least one inlet valve and at least one exhaust valve for controlling connection between the combustion chamber in the cylinder and an inlet system and an exhaust system, respectively, said apparatus comprising:

a rotatable camshaft having a cam curve including a rising ramp (10a) and a falling ramp (10b) that interacts with a valve mechanism (14) for actuation of at least one of the inlet or exhaust valve under the action of a valve spring (13), the valve mechanism (14) comprising control members (21, 22, 23, 24, 25 and 26) that allow return movement of the valve mechanism to be controlled during the closing phase of the valve, independently of the falling ramp (10*b*) of the cam curve, such that mechanical contact between the cam curve and the valve is broken and said control members (21, 22, 23, 24, 25 and 26) being configured so that closing of the valve is delayable for an adjustable period of time using a hydraulically adjustable force counteracting a closing force of the valve spring (13).

2. The apparatus as recited in claim 1, wherein the valve (12) is mechanically actuated by the rising ramp (10*a*) of the cam curve and a hydraulic circuit is connected to the control members (21, 22, 23, 24, 25 and 26) and which allows a flow of hydraulic fluid to the control members while the valve mechanism (14) is following the rising ramp, thereby permitting the blockage of a return flow from the control members once the rising ramp has been passed.

3. The apparatus as recited in claim 1, wherein the control members (21, 22, 23, 24, 25 and 26) are inactive during earliest possible valve closure so that the valve movement follows the cam curve.

4. The apparatus as recited in claim 3, wherein the control members (21, 22, 23, 24, 25 and 26) are configured to switch from an active to the inactive state when the valve (12) is in an area of maximum opening position, for actuation of the valve return movement.

5. The apparatus as recited in claim 3, wherein the control members (21, 22, 23, 24, 25 and 26) are configured to switch from an active to the inactive state during return movement of the valve (12) from an opening position.

6. The apparatus as recited in claim 4, wherein the valve (12) further comprises an apparatus that reduces valve closing speed before said valve (12) lands against a valve seat.

7. The apparatus as recited in claim 3, wherein the control members (21, 22, 23, 24, 25 and 26) include a hydraulic piston cylinder mechanically connected to said valve (12) and that is actuable by a hydraulic valve (26).

8. The apparatus as recited in claim 1, wherein the control members (21, 22, 23, 24, 25 and 26) are operably associated with the engine exhaust valves (12) for establishing internal exhaust gas recirculation.

9. The apparatus as recited in claim 1, wherein the control members (21, 22, 23, 24, 25 and 26) are operably associated with the engine inlet valves (12) for varying the closing sequence.

* * * * *